UNITED STATES PATENT OFFICE 2,343,661

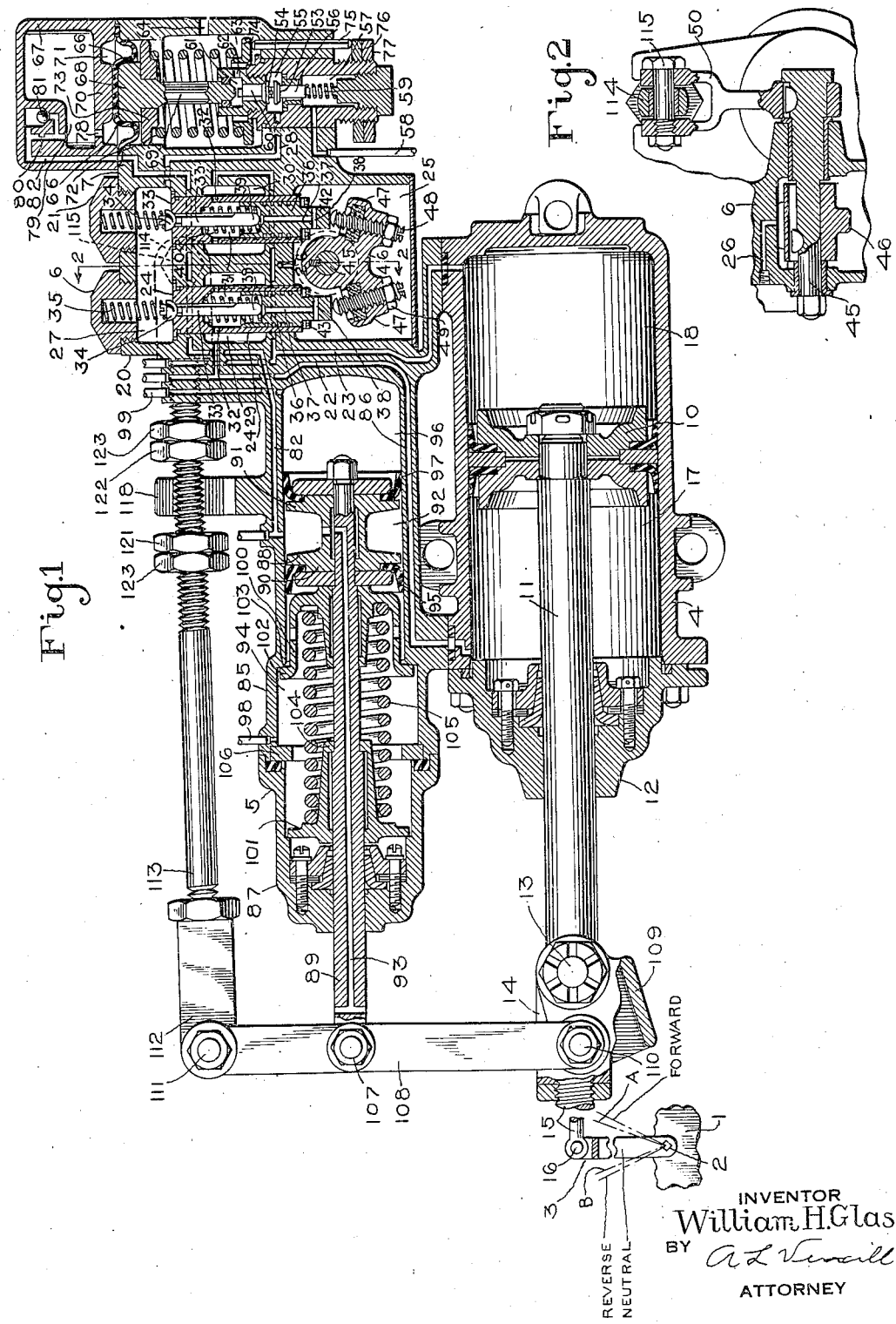

FLUID PRESSURE MOTOR

William H. Glass, Pittsburgh, Pa., assignor to The Westinghouse Air Brake Company, Wilmerding, Pa., a corporation of Pennsylvania Application March 31, 1943, Serial No. 481,194

6 Claims. (Cl. 121—41)

This invention relates to fluid pressure motors and more particularly to the type arranged to operate in accordance with selected operations of a manual controller for controlling the positioning or operation of a device such as a clutch.

In the copending application of Roy R. Stevens, Serial No. 448,167, filed June 23, 1942, and assigned to the assignee of the present application, there is disclosed an apparatus embodying a motor which is operable by fluid pressure to control the operation of a clutch control element. The clutch controlled by the element is of the type having a forward drive condition, a reverse drive condition, and a neutral non-driving condition, and said element has three positions, namely, forward, reverse, and neutral, for correspondingly conditioning the clutch.

The fluid motor for the clutch control element embodies a power piston having forward, reverse, and neutral positions, a pilot piston having like positions, and a control valve device controlled jointly by the power and pilot pistons. The pilot piston is movable by fluid pressure relative to the power piston to actuate the control valve device for supplying fluid under pressure from a communication to either one side or the other of the power piston for causing movement thereof to move the clutch control element to either one or the other of its drive positions. A cut-off valve device, controlled in one of the embodiments by the pilot piston, controls the supply of fluid under pressure to the communication leading to the control valve device. When the pilot piston is between its forward and reverse positions, the cut-off valve device is operative to supply fluid under pressure to the communication leading to the control valve device, but upon movement of the pilot piston to either of said positions the cut-off valve device operates to cut-off the supply of fluid pressure to said communication and to open same to atmosphere. With one side or the other of the power piston open to this communication at the time it is opened to atmosphere, the power piston will be relieved of actuating force, and the purpose of this is to relieve the shifting bearings in the clutch of actuating force from the power piston after the clutch control element has been moved to the desired driving position.

In order to insure that the power piston will not be relieved of actuating force prior to obtaining the desired positioning of the clutch control element, initial movement of the pilot piston toward either its forward or reverse positions is limited to a degree sufficient to operate the control valve device to open the fluid pressure supply communication to the selected side of the power piston, but insufficient to cause operation of the cut-off valve device to open said communication to atmosphere. Further movement of the pilot piston then occurs along with the power piston which prevents the pilot piston obtaining its forward or reverse position substantially ahead of the power piston obtaining its corresponding position, which, in combination with other arrangements, insures that the cut-off valve device will not operate to relieve the power piston of actuating force until after the clutch control element has been positioned as desired.

One object of the present invention is the provision of an improved arrangement for limiting the initial movement of the pilot piston toward either its forward position or its reverse position to accomplish the result just described.

In the above referred to copending application, the control valve device comprises a lever which operates in a slot the opposite ends of which constitute stops for limiting the initial movement, just described, of the pilot piston. These stops are fixed according to the travel or movement of a certain clutch part, such as the driven part. Occasionally however a clutch is found in use in which the driven part has less travel, in which case, the pilot piston of the fluid pressure motor above described cannot move far enough to cause operation of the cut-off valve device to relieve the power piston of actuating force after the clutch control element has been moved to its forward or reverse position.

Another object of the invention is therefore the provision of a fluid pressure motor for a clutch or the like embodying means for regulating the initial movement of the pilot piston to any specific clutch, so as to insure intended operation of the cut-off valve device.

Still another object of the invention is the provision of means for regulating the initial movement of the pilot piston toward either its forward or reverse positions in accordance with the specific clutch to which the motor is connected, which means are readily accessible and adjustable.

Other objects and advantages of the invention will be apparent from the following more detailed description.

In the accompanying drawing, Fig 1 is a sectional view, partly in diagrammatic form, of a fluid motor embodying the invention; and Fig. 2 is a sectional view taken on the line 2—2 in Fig. 1.

Description

In the drawing, the reference numeral 1 indicates a portion of a clutch housing which may contain a clutch, such as above described. A rock shaft 2 is provided for moving the driven part of the clutch in housing 1 to its different positions and this shaft is operable by a lever or arm 3 which has a "forward" position, a "reverse" position, and a "neutral" or disengaged position for correspondingly positioning the driven part of the clutch. These positions of arm 3 are indicated by legends in the drawing.

For selectively moving the clutch arm 3 to any one of its different positions, a fluid motor is provided which comprises a power portion 4, a pilot portion 5, a fluid pressure control mechanism 6, and a cut-off or unloading valve device 7.

The power portion 4 comprises a casing containing a piston 10 connected to one end of a piston rod 11 which extends through a pressure head 12. The outer end of piston rod 11 is pivotally connected by a bolt 13 to one end of a link 14 the opposite end of which is adjustably connected by screw threads to an eye bolt 15. The eye bolt 15 in turn is connected by a pin 16 to the end of the clutch operating arm 3.

The power piston 10 has at one side a pressure chamber 17 provided for receiving fluid under pressure to act on one side of the piston, while at the opposite side of the piston is a pressure chamber 18 provided for receiving fluid under pressure to act on the opposite side. When chamber 17 is supplied with fluid under pressure and chamber 18 is open to the atmosphere, as will be later described, the piston 10 will move in the direction of the right hand for thereby rocking the clutch arm 3 in the direction toward "forward" position, while when chamber 17 is open to the atmosphere and fluid is supplied to chamber 18 the piston 10 will operate to move the clutch control arm 3 in the direction of "reverse" position.

The fluid pressure control mechanism 6 is provided for supplying fluid under pressure to and releasing fluid under pressure from the two pressure chambers 17 and 18 for controlling operation of the piston 10 to position the clutch arm 3. This mechanism comprises two like fluid pressure supply and release valve devices, 20 and 21, the device 20 being operative to control the pressure of fluid in pressure chamber 17 through the medium of a passage 22, while the device 21 is operative to control the pressure of fluid in pressure chamber 18 by way of a passage 23.

Each of the valve devices 20 and 21, comprises a bushing 24 pressed into the casing and open at one end to a chamber 25 which may be in constant communication with the atmosphere through a fluid pressure release passage 26, and open at the opposite end to a chamber 27 arranged to be supplied with fluid under pressure through a passage 28. Surrounding the bushing 24 in the valve device 20 is cavity 29 open to passage 22, while surrounding said bushing in the valve device 21 is a similar cavity 30 open to passage 23.

Each of the bushings 24 has an axial bore connecting pressure chamber 27 to a chamber 31 in the bushing which chamber 31 is connected through one or more ports 32 to the annular cavity 29 or 30 encircling the bushing. Slidably mounted in each bore is the fluted stem 33 of a fluid pressure supply valve 34 disposed in chamber 27 and arranged to seat against the end of the bushing to thereby control communication between said chamber and chamber 31 within the bushing. Each of two springs 35 in chamber 27 acts on one of the supply valves 34 for urging same to its closed position, i. e., seated against the end of the bushing 24.

The chamber 31 in each bushing 24 constitutes one end of a bore extending through the bushing and opening at one end to chamber 25, and slidably mounted in this bore is a plunger 36 which has an axial passage 37 open at one end to chamber 31 and at the opposite end to a radial passage 38 opening to chamber 25. On the end of the supply valve stem 33 which extends into the chamber 31 is formed a release valve 39 arranged to cooperate with the plunger 36 around the periphery of the axial passage 37 for controlling communication between chamber 31 and chamber 25 which is open to the atmosphere. A spring 40 in chamber 31 is supported at one end on the bushing while the opposite end bears against the plunger 36 urging same in the direction away from the release valve 39.

Each of the plungers 36 is provided with a portion 42 of reduced diameter in which the radial passage 38 is formed and which freely projects through a central opening provided in a stop 43 which is secured to the end of the bushing. This stop is provided for engagement by a plunger to limit outward movement thereof under the action of spring 40.

An operating shaft 45 disposed midway between portions 42 of the two plungers 36, and extending at right angles to their axes is journaled at opposite ends in the housing. Keyed to this shaft in chamber 25 is an operating member 46 having two oppositely arranged arms 47 one disposed over each of the plungers 36. An operating screw 48 is mounted in each of these arms, one screw for engaging the end of plunger 36 in the valve device 20 while the other is arranged to engage the end of plunger 36 of the valve device 21. Each of these adjusting screws is secured in an adjusted position by a lock nut 49 which is tightened against the respective arm. Outside of chamber 25 an operating lever 50 is secured to one end of shaft 45 for rocking same in either one direction or the opposite direction.

With the lever 50 in a neutral position, such as shown in Fig. 1, and in which it will be substantially at right angles to the power piston rod 11, both adjusting screws 48 are adjusted so that plungers 36 in the two valve devices 20 and 21 will be positioned just out of contact with the release valves 39, as shown slightly exaggerated in Fig. 1. When so adjusted, the pressure chamber 17 at one side of the power piston 10 will be opened to the atmosphere through passage 22 and past the release valve 39 in the valve device 20, while pressure chamber 18 at the opposite side of said piston will be open to the atmosphere through passage 23 and thence past release valve 39 in the valve device 21.

Rocking of the lever 50 out of neutral position in a clockwise direction, as viewed in Fig. 1, will move plunger 36 in the valve device 20 inwardly into seating engagement with the release valve 39 for closing communication between the pressure chamber 17 and atmosphere and a slight further rocking of said lever will then operate through said valve to open the supply valve 34. When the supply valve 34 in the valve device 20 is thus opened, fluid under pressure supplied to chamber 27 will flow past said valve to passage 22 and to pressure chamber 17 for acting on the left-hand face of power piston 10 to move same in the direction of the right-hand. Return of lever 50 to its neutral position will allow the supply valve 34 in the valve device 20 to seat under the action of spring 35 and then plunger 36 will be moved out of engagement with the release valve 39 by spring 40, so that pressure chamber 17 will be opened past said release valve to atmosphere.

Likewise, movement of lever 15 from neutral position in a counterclockwise direction, as viewed in Fig. 1, will first seat the release valve 39 and then open the supply valve 34 in the valve device 21 to thereby permit fluid under pressure to flow from pressure chamber 27 to pressure chamber 18 at the right-hand side of the power piston 10 for moving said piston in the direction of the left-hand, while return of said lever to neutral position will open chamber 18 to the atmosphere past the release valve 39 in the valve device 21.

When either of the valve devices 20 or 21 is operated to supply fluid under pressure to chamber 17 or 18, respectively, as just described, plunger 36 in the other valve device is moved outwardly by spring 40 into contact with stop 43 thereby maintaining the respective release valve 39 open, opening the respective piston chamber 17 or 18 to the atmosphere, as will be apparent.

The unloading device 7 comprises two coaxially arranged oppositely seating poppet valves 53 and 54 contained in a chamber 55 which is open through passage 28 to chamber 27 in the fluid pressure control mechanism 6. These valves engage each other in chamber 55 for movement in unison. The valve 53 has a stem 56 extending into a chamber 57 which, in use, is intended to be constantly supplied with fluid under pressure from any suitable source by way of a supply pipe 58. The valve 53 controls communication between chamber 57 and chamber 55 and when open will allow the flow of fluid under pressure from pipe 58 to chamber 27 in the fluid pressure control mechanism, and when closed or seated will cut-off such flow of fluid under pressure. A spring 59 in chamber 57 acts on stem 56 of the supply valve 53 for unseating same and for seating the release valve 54.

The release valve 54 is provided with a fluted stem 60 extending into a chamber 61 which is in constant communication with the atmosphere through a passage 62, a chamber 63, and a passage 64. This valve is provided for closing communication between chamber 55 and the atmospheric chamber 61 when the supply valve 53 is open, and for opening said communication upon closure of the supply valve 53 for thereby opening chamber 27 in the fluid pressure control mechanism to the atmosphere.

The unloading device 7 further comprises a movable abutment preferably in the form of a flexible diaphragm 66 which is clamped around its periphery between the casing and a cover 67. Chamber 63 is formed at one side of the diaphragm 66 and contains a follower member 68 which engages the diaphragm and which has a stem 69 depending therefrom for engagement with stem 60 of the release valve 54. When the diaphragm is in its normal position shown, as defined by engagement with a stop 70 extending into a pressure chamber 71 formed at the opposite side of said diaphragm, there preferably is a slight space between the end of stem 69 and stem 60 of the release valve 54 when said valve is seated, as shown in the drawing.

Chamber 63 also contains a control spring 72, one end of which bears against a seat 73 which is slidably mounted on the stem 69 in contact with the diaphragm follower 68. The opposite end of spring 72 is supported on an adjustable seat 74 which is carried by a plurality of spaced struts 75, only one of which is shown in the drawing. These struts extend through suitable bores in the casing and their opposite ends are engaged by an adjusting nut 76 having screw-threaded engagement with an extended portion of the casing. Adjustment of the nut 76 is arranged to act through the struts 75 to move the spring seat 74 against the spring 72 to thereby obtain a desired force of said spring on the diaphragm follower member 68 to oppose movement thereof in the direction of the poppet valves 53 and 54. A lock nut 77 is provided on the casing extension for engaging the adjusting nut 76 to secure same in adjusted position.

Pressure chamber 71 above the diaphragm 66 is open through a passage 78 to a timing chamber 79 formed in the cover 67.

The timing chamber 79 is open to a passage 82 connected to the pilot portion 5 of the motor through two parallel passages one containing a choke 80 and the other containing a check valve 81 arranged to prevent flow of fluid in the direction from passage 82 to chamber 79 but to allow flow in the opposite direction. It will thus be seen that flow of fluid in the direction from passage 82 to chamber 79 will be restricted by choke 80 while flow in the opposite direction may occur by way of the check valve 81 as well as through the choke 80 and thus at a more rapid rate.

The pilot portion 5 of the motor comprises a cylinder 85 having a piston bore 86. One end of the cylinder 85 is open, and secured over this end is a cup-shaped pressure head 87. A pilot piston 88 is mounted to slide in the bore 86 and is rigidly connected to one end of a piston rod 89 which extends through the pressure head 87 parallel to the piston rod 11.

The pilot piston 88 comprises two pressure heads 90 and 91 which are spaced apart and integrally connected, and between these heads is a chamber 92 which is in constant communication with the atmosphere through a passage 93 provided in the piston rod 89. At the opposite side of pressure head 90 is a pressure chamber 94, and a suitable packing cup 95 secured to said pressure head and having sliding contact with the wall of bore 86, is provided to prevent leakage of fluid under pressure from chamber 94 to chamber 92. The pressure head 91 has at its opposite face a pressure chamber 96 containing an oppositely arranged packing cup 97 secured to said pressure head and having sliding contact with the wall of bore 87 for preventing leakage of fluid under pressure from chamber 96 to chamber 92.

The pressure chamber 94 is connected to a control pipe 98 through which fluid under pressure may be supplied to and released from said chamber for acting on one side of the piston 88. Pressure chamber 96 at the opposite side of the pilot piston is connected to a control pipe 99 through which fluid under pressure may be supplied to and released from said chamber for acting on the right-hand face of the pilot piston.

The two pipes 98 and 99 may be connected to any suitable control device arranged to open one of said pipes to the atmosphere while varying the pressure of fluid in the other pipe. A control device of this type is shown and fully described in the copending application hereinbefore referred.

Two stops 100 and 101 are slidably mounted on the pilot piston rod 89 within pressure chamber 94. One end of stop 100 engages the piston head 88 and at its opposite end has an out-turned annular flange 102 arranged to cooperate with an annular shoulder 103 in the cylinder 85 to limit movement thereof in the direction of the right-hand. The stop 101 is provided with an annular in-turned shoulder 104 at one end arranged to cooperate with the shoulder on the pilot piston rod 89 for moving said stop in the direction of the right-hand upon corresponding movement of the piston rod 89 from the position shown. The opposite end of stop 101 is arranged to engage a shoulder in the pressure head 87 as shown in Fig. 1 to limit movement of the stop in the direction of the left-hand. A coil spring 105 under initial compression and encircling the piston rod 89 bears at one end against the stop 100 and at the opposite end against the stop 101.

From the above description it will be seen that in case of movement of the pilot piston 88 and rod 89 in the direction of the right-hand the stop 101 and engaging end of control spring 105 will move with said rod, but the stop 100 will remain stationary, and such movement of said piston will therefore be opposed by said spring and will be limited by contact between stop 101 and a ring 106 clamped between the cylinder 85 and pressure head 5. Upon movement of pilot piston 88 and rod 89 in the direction of the left-hand, the stop 101 will remain stationary while the stop 100 will move with said piston so that spring 105 will oppose this movement which will be limited by engagement of stop 100 with the ring 106. Engagement between stop 100 and shoulder 103 in the cylinder and between stop 101 and the pressure head acts to limit expansion of spring 105 and will therefore define a neutral position of the pilot piston, in which said piston is shown in the drawing.

The end of the pilot piston rod 89 is connected by a pin 107 to a lever 108 intermediate its ends. One end of this lever is connected to one end of a link 109 by a pin 110 and the opposite end of this link is connected to pin 13 in the end of the power piston rod 11. The opposite end of lever 108 is connected by a pin 111 to one end of a link 112, the opposite end of which is connected by screw-threads to one end of a reach rod 113. The opposite end of the reach rod is adjustably connected to one end of a link 114, the other end of which is connected by a pin 115 to the free end of lever 50 in the fluid pressure control mechanism 6.

The reach rod 113 extends between two jaws 118 projecting from the pilot piston cylinder 85. At one side of the jaws 118 a stop nut 121 is adjustably mounted on the reach rod by screw-threads for engaging said jaws, while a like nut 122 is mounted on the reach rod at the opposite side of the jaws for engagement therewith. The stop nuts 121 and 122 are locked to the reach rod 18 in adjusted conditions by suitable lock nuts 123.

The two adjusting nuts 121 and 122 are so adjusted on the reach rod 113 as to limit movement of said rod in either direction from a neutral position shown in the drawing, to a degree just sufficient to actuate the lever 50 of the fluid pressure control mechanism 6 in either direction from its neutral position to seat the release valve 39 and open the supply valve 34 of the fluid pressure supply and release valve device 20 or 21.

*Operation*

With chambers 94 and 96 at opposite sides of the pilot piston 88 both vented or open to atmosphere, the pilot piston will assume a neutral position, as shown, under the action of spring 105. With the pilot piston thus positioned, the parts of the fluid pressure control mechanism 6 will also assume the positions shown opening pressure chambers 17 and 18 at the opposite sides of the power piston 10 to atmosphere, and the power piston and thereby the clutch control arm will assume their "neutral" position shown for reasons which will be later brought out.

Also, with the pilot piston 88 in its neutral position, the timing chamber 79 and diaphragm chamber 71 in the unloading device 7 will be open to atmosphere by way of passage 82, chamber 92 between piston heads 90 and 91 of said piston and passage 93 in piston rod 89. Control spring 72 in the unloading device will therefore be effective to hold the diaphragm 66 and follower 68 in their normal positions shown in the drawing which permits closure of the release valve 54 and opening of supply valve 53 by spring 59. Fluid under pressure will therefore be supplied from pipe 58 to chamber 27.

If now it is desired to effect movement of the clutch control arm 3 from "neutral" position to "forward" position, fluid under pressure is supplied through pipe 98 to chamber 94 at one side of the pilot piston 88, while chamber 96 at the opposite side is maintained opened to atmosphere through pipe 99. When the pressure of fluid thus supplied to chamber 94 and acting on one side of the pilot piston 88 becomes increased to a degree sufficient to overcome the opposing force of spring 105 on follower 101, said piston will move in the direction of the right-hand. The piston 88 acts through the piston rod 89 on the lever 108, and due to relatively greater reluctance to movement of the power piston 10, the movement of piston 88 will turn the lever in a clockwise direction about its fulcrum connection, at pin 110 with the power piston rod 11 and thus move the reach rod 113 in the direction of the right-hand, to a position defined by contact between the regulating nut 121 and jaws 118, which then holds the pilot piston against further movement. This movement of the reach rod 113 however rocks the arm 50 in the fluid pressure control mechanism 6 in a clockwise direction as viewed in Fig. 1 to a degree sufficient for actuating the supply and release valve device 20 to supply fluid under pressure from pressure chamber 27 to chamber 17 at the left-hand side of the power piston 10, while the supply and release valve device 21 maintains chamber 18 at the opposite side of the power piston open to atmosphere. The pressure of fluid thus supplied to pressure chamber 17 at one side of the power piston 10 then effects movement thereof in the direction of the right-hand and this movement pulls the clutch control arm 3 out of "neutral" position toward "forward" position.

When the power piston 10 moves under the influence of fluid pressure in pressure chamber 17 as just described, the lever 108 is rocked about the fulcrum connection with the reach rod 113, at pin 111, which at this time is stationary, and therefore allows movement of the pilot piston 88 by pressure of fluid in chamber 94 in the same direction as the power piston 10 is moving. The two pistons thus continue to move together until the clutch control arm 3 attains substantially its "forward" position, at which time the pilot piston 88 opens passage 82 to chamber 94. This opening of passage 82 to chamber 94 preferably occurs just before the pilot piston 88 attains its extreme right-hand position defined by contact between the follower 101 and the stop ring 106.

When passage 82 is thus opened to pressure chamber 94, fluid under pressure then flows from said chamber through said passage and choke 80 to timing chamber 79 and diaphragm chamber 71 in the unloading device 7, and when the pressure of fluid thus obtained in chamber 71 becomes increased to a degree sufficient to overcome the opposing force of control spring 72, the diaphragm 66 is deflected in a downwardly direction and unseats the release valve 54 and seats the supply valve 53. The seating of the supply valve 53 cuts off further supply of fluid under pressure to pressure chamber 27 in the fluid pressure control mechanism 6 and thereby to the connected pressure chamber 17 at the left-hand side of the power piston 10, while opening of the release valve 54 opens said chambers to atmosphere for thereby relieving the power piston 10 of the pressure of fluid in chamber 17, in order to relieve the clutch control arm 3 and thereby the thrust bearings in the clutch controlled by said arm of operating force.

The movement of the pilot piston 88 by pressure of fluid in chamber 94 is stopped by follower 101 engaging the stop ring 106 immediately following the opening of passage 82 to pressure chamber 94, as above described, and the regulating nut 121 on the reach rod 113 is so adjusted as to prevent the pilot piston 88 obtaining this extreme position before the power piston 10 attains the position in which arm 3 is substantially in its "forward" position. The choke 80 restricting the flow of fluid under pressure to the timing chamber 79 is provided to then delay operation of the unloading valve device 7 to release fluid under pressure from the power piston chamber 17, after the pilot piston ceases movement and the clutch control arm 3 is in or substantially in its "forward" position, in order that such pressure on the power piston may continue effective for a period of time which will insure complete stroking, or further movement of the power piston, if necessary, to insure that the clutch control arm 3 is moved to its "forward" position regardless of variable conditions in the clutch which may act to delay or oppose the desired positioning of the clutch arm 3.

After the pilot piston 88 is stopped in its right-hand position, there may be a slight continued movement of the power piston 10 relative to said pilot piston as above mentioned and such movement will act to rock the lever 108 in a counterclockwise direction about its fulcrum connection with the pilot piston rod 89 and thus operate the reach rod 113 to turn lever 50 of the fluid pressure control mechanism 6. This movement of the lever 50 will be in a counterclockwise direction which will move regulating nut 121 on the reach rod out of contact with the jaws 118 and will then continue until the power piston 10 ceases movement. For the maximum degree of movement of the power piston 10 after the pilot piston 88 stops moving, the control lever 50 in the fluid pressure control mechanism 6 will not be operated however sufficiently to allow closing of the supply valve 34 in the valve device 20. In other words, the supply valve 34 in the valve device 20 will be maintained open even upon a maximum degree of movement of the power piston 10 relative to the pilot piston 88, in order that the unloading valve device 7 may operate to release fluid under pressure from the power piston chamber 17 and thus relieve the clutch arm 3 of actuating force, as above described.

If the operator now desires to return the clutch control arm 3 from "forward" position to "neutral" position, he opens pipe 98 to atmosphere for thereby releasing the fluid under pressure from pilot piston chamber 94, and as long as passage 82 remains open to chamber 94, fluid under pressure will also be released from chamber 79 in the unloading valve device 7 by way of check valve 81 and through chamber 94. When the pressure of fluid in chamber 94 is thus sufficiently reduced, the force of spring 105 on stop 101 moves the pilot piston 88 relative to the power piston 10 in the direction of the left-hand to thereby operate the lever 108 to pull the reach rod 113 in the same direction until the regulating nut 122 engages the jaws 118. This movement of the pilot piston 88 opens passage 82 to the atmospheric chamber 92 between the two piston heads 90 and 91 of said piston whereupon further release of fluid under pressure from timing chamber 79 and diaphragm chamber 71 in the unloading device 8 occurs by way of chamber 92. The release of fluid under pressure from the timing chamber 79 and diaphragm chamber 71 will occur rapidly by way of the check valve 81 and when such pressure is sufficiently reduced, the control spring 72 returns the diaphragm 66 and follower 68 to their normal positions shown thereby allowing the release valve 54 to close and the supply valve 53 to open. Fluid under pressure from the supply pipe 58 then again flows to the supply chamber 27 in the fluid pressure control mechanism 6.

Movement of the reach rod 113 to the position defined by engagement of regulating nut 122 with jaws 118 operates the arm 50 in the fluid pressure control mechanism 6 in a counterclockwise direction as viewed in Fig. 1 to thereby actuate the valve device 20 to open pressure chamber 17 at one side of the power piston 10 to atmosphere and at the same time actuates the valve device 21 to supply fluid under pressure from the supply chamber 27 to pressure chamber 18 at the opposite side of the power piston. The pressure of fluid thus supplied to chamber 18 then acts to move the power piston 10 in the direction of the left-hand, for thereby rocking the clutch control arm 3 from its "forward" position in the direction of its "neutral" position.

At the time the power piston 10 starts moving from its extreme right-hand position in the direction of the left-hand, the pilot piston 88 will be to the right of its neutral position shown and the reach rod 113 will be in a position defined by contact between the regulating nut 122 and jaw 118, as above described, so that as the power piston 10 moves toward the right-hand, the lever 108 will rock in a clockwise direction about the fulcrum connection with pin 111 and the pilot piston 88 will move toward its neutral position under the action of spring 105. The two pistons thus continue to move together until the pilot piston 88 attains its neutral position in which it will then be held by the force of spring 105. Further movement of the power piston 10 under pressure of fluid in chamber 18 will then rock the lever 108 in a clockwise direction about the fulcrum pin 107 connected to the pilot piston rod 89 and this movement of said lever will move the reach rod 113 in the direction of the right-hand and return the lever 50 in the fluid pressure control mechanism 6 back toward its neutral position. The lever 50 will attain its neutral position at substantially the time the power piston 10 and thereby clutch arm 3 attain their "neutral" positions, and the valve device 21 in the mechanism 6 will therefore be operated to cut off the supply of fluid under pressure to the pressure chamber 18 and to open said chamber to atmosphere for thereby relieving the power piston 10 of actuating force. The power piston 10 will therefore be stopped in its neutral position shown for neutralizing the clutch control arm 3.

If the operator now desires to move the clutch control arm 3 from its "neutral" position to its "reverse" position, he supplies fluid under pressure through pipe 99 to pressure chamber 96 at the right-hand side of the pilot piston 88 while retaining chamber 94 at the opposite side open to atmosphere to the pipe 98. As a result, the pilot piston 88 initially moves toward the left-hand relative to the power piston 10 for thereby operating lever 108 to pull the reach rod 113 toward the left-hand to a position defined by contact between the regulating nut 122 and the jaws 118. This operation of reach rod 113 rocks the lever 50 in the fluid pressure control mechanism 6 in a counter-clockwise direction for actuating the valve device 21 in said mechanism to supply fluid under pressure to pressure chamber 18 while allowing the valve device 20 to remain in the condition opening pressure chamber 17 to atmosphere. The power piston 10 is then moved by pressure of fluid in chamber 18 in the direction of the left-hand and rocks the clutch control arm 3 from its "neutral" position toward its "reverse" position. During this movement of the power piston 10 the pilot piston 88 moves therewith in the same manner as above described, and just before contact between follower 100 and stop ring 106, the pilot piston opens communication between passage 82 and pressure chamber 96. This occurs at substantially the time the power piston 10 has moved the clutch control arm 3 to its "reverse" position, following which the unloading device 7 operates in the same manner as before described to cut-off the supply of fluid under pressure to pressure chamber 18 and to open said chamber to atmosphere, for thereby relieving the power piston 10 and clutch control arm 3 of actuating force.

To now move the clutch control arm 3 from "reverse" position back to "neutral" position, fluid pressure is released from pressure chamber 96 at one side of the pilot piston by way of pipe 99. Spring 105 then moves the pilot piston 88 in the direction of the right-hand for rocking the lever 108 to move the reach rod 113 in the same direction to a position defined by the regulating nut 121 contacting the jaws 118. This movement of the pilot piston 88 relative to the power piston 10 again closes communication between passage 82 and pressure chamber 96 and opens said passage to chamber 92 between the two piston heads 90 and 91 for thereby venting fluid under pressure from the timing chamber 79 and diaphragm chamber 71 in the unloading device 7 whereupon said device operates to again supply fluid under pressure to the supply chamber 27 in the fluid pressure control mechanism 6 in the same manner as before described.

Movement of the reach rod 113 to the position defined by contact between regulating nut 121 and jaws 118 turns lever 50 of the fluid pressure control mechanism in a clockwise direction as viewed in Fig. 1 for thereby operating the valve device 20 therein to supply fluid under pressure to pressure chamber 17, while the valve device 21 remains in the condition opening pressure chamber 18 to atmosphere. Pressure of fluid thus supplied to chamber 17 then moves the power piston 10 in the direction of the right-hand for pulling the clutch control arm 3 from its "reverse" position in the direction of "neutral" position. The initial movement of the power piston 10 out of its left-hand position rocks lever 108 about its fulcrum connection with reach rod 113 to allow the pilot piston 88 to be returned to its neutral position shown under the action of spring 105. Following this, the lever 108 rocks about the pin 107 to return the reach rod 113 to its neutral position for thereby operating the fluid pressure control mechanism 6 to vent the fluid pressure from pressure chamber 17 at substantially the time the power piston and thereby the clutch control arm 3 attain their "neutral" positions, for thereby stopping said piston and arm in such positions.

If the clutch control arm 3 should occupy its "forward" position and it should be desired to move said arm from "forward" position to "reverse" position without stopping in "neutral" position, fluid under pressure is vented from pressure chamber 94 at one side of the pilot piston 88 by way of pipe 98, and at the same time fluid under pressure is supplied through pipe 99 to pressure chamber 96 at the opposite side of said piston. As a result, the combined action of spring 105 through follower 101 on the pilot piston 88, and the increase in pressure in chamber 96 at the opposite side of the pilot piston is initially effective to move said piston relative to the power piston 10 to the position in which passage 82 is open to the atmosphere by way of chamber 92 between the two piston heads 90 and 91 and in which the regulating nut 122 on the reach rod 113 engages the jaws 118. As a result, the unloading device 7 operates as above described to again open the fluid pressure supply connection between the supply pipe 58 and chamber 27 in the fluid controlled mechanism 6, and the arm 50 in said mechanism actuates the valve device 21 therein to supply fluid under pressure to chamber 18 while the valve device 20 therein remains in the condition opening pressure chamber 17 to the atmosphere. As a result, the piston 10 will be caused to move in the direction of the left-hand for thereby rocking the arm 3 out of its "forward" position in the direction of its "reverse" position. As the power piston thus moves, the pilot piston 88 moves therewith under the pressure of fluid in chamber 96 and finally against the opposing force of spring 105 until said pilot piston attains substantially its left-hand position defined by contact between the movable stop 102 and ring 106. In this left-hand position of the pilot piston fluid under pressure is supplied from pressure chamber 96 through passage 82 to the unloading valve device 7 for effecting operation thereof to release fluid under pressure from pressure chamber 18. This release of pressure from chamber 18 will occur at substantially the time the power piston 10 attains its extreme left-hand position or slightly thereafter in the same manner as above described, in order to insure that the clutch control arm 3 will be in its "reverse" position.

Upon supply of fluid under pressure to pipe 98 and the opening of pipe 99 to atmosphere the fluid motor will operate to move the clutch control arm 3 from its "reverse" position to its "forward" position in a manner which will be apparent from the above description.

In the operation above described it will be noted that the regulating nuts 121 and 122 limit the initial movement of the pilot piston 88 relative to the power piston 10 to a degree sufficient to actuate the fluid pressure control mechanism 6 to supply fluid under pressure either to pressure chamber 17 at one side of the power piston or pressure chamber 18 at the opposite side, but insufficient to open passage 82 to chamber 94 or 96, whichever is supplied with fluid under pressure for moving the pilot piston. The passage 82 is connected to the pressure chamber 94 or 96 by the pilot piston only after the power piston has moved the clutch control arm 3 to substantially its "forward" position or its "reverse" position, and the purpose of thus delaying the supply of fluid to the timing chamber 79 in the unloading device 7 is to permit the use of a timing chamber of minimum size with respect to a practical size of choke 80.

If it should be desired to arrange the motor to control operation of a clutch in which the movable part has less travel than in the clutch above described and which would therefore limit the movement of control arm 3 to positions such as indicated by legends "A" and "B" indicating the "forward" and "reverse" positions of the specific clutch, it will be seen that movement of the power piston 10 will be correspondingly reduced. With the regulating nuts 121 and 122 adjusted as above described, this reduced stroke of the power piston 10 would therefore be inadequate to allow the pilot piston 88 to move to either extreme position for opening passage 82 to pressure chamber 94 or pressure chamber 96. As a result, the unloading valve device 7 could not operate to relieve the power piston and thereby the clutch operating arm of actuating force. To meet this condition the regulating nuts 121 and 122 may therefore be adjusted away from each other to a degree sufficient to allow the pilot piston 88 to obtain either of its extreme positions for opening passage 82 to pressure chamber 94 or 96 with the power piston 10 in either of its extreme positions defined by the clutch operating parts having the reduced travel. When the regulating nuts are so adjusted, the fluid motor will operate to control the positioning of the clutch arm 3 having "Forward" and "Reverse" positions such as indicated by the legends A and B, in the same manner as above described.

Summary

From the above description it will now be seen that I have provided a fluid motor for moving a member, like the movable part of a clutch, to any selected one of its positions and which then operates automatically to remove the actuating force to avoid damage to the operated parts. The unloading means for removing the actuating force is controlled substantially in accordance with the position of the power piston and thus maintained against operation until the clutch part has substantially obtained the desired position in order to insure such positioning. A novel arrangement is provided for thus delaying the operation of the unloading means, and the arrangement is adjustable to obtain the same result for different operating strokes of the power piston required for controlling different clutches the movable parts of which have different degrees of travel.

Having now described my invention, what I claim as new and desire to secure by Letters Patent, is:

1. In combination, a movable abutment movable by pressure of fluid in a chamber, valve means operable to supply fluid under pressure to said chamber, a valve device arranged to control said supply of fluid under pressure to said chamber and operable to cut off such supply and to vent fluid under pressure from said chamber, actuating means operable upon movement relative to said abutment to effect operation of said valve means and upon further movement to a certain position to effect operation of said valve device, control means connecting said actuating means to said valve means and abutment providing for movement of said actuating means relative to said abutment to effect operation of said valve means, and adjustable means included in said control means operable to limit movement of said actuating means relative to said abutment to a degree for effecting operation of said valve means and then providing for further movement of said actuating means with said abutment, and adjustable to provide for said actuating means obtaining said certain position in a chosen position of said abutment.

2. In combination, a power abutment movable upon supply of fluid under pressure to a chamber, valve means operable to supply fluid under pressure to said chamber, a valve device operable to cut off said supply of fluid under pressure to said chamber and to vent fluid under pressure from said chamber, a pilot abutment movable by fluid under pressure, actuating means connecting said valve means to said power and pilot abutments providing for movement of said abutments relative to each other and in unison, said pilot abutment being movable by fluid under pressure to first actuate said valve means and then to a certain position to effect operation of said valve device, said actuating means including adjustable means operative to limit movement of said pilot abutment by fluid under pressure relative to said power abutment and then providing for movement of said pilot abutment with said power abutment, said adjustable means being adjustable to provide for said pilot abutment obtaining said certain position in a chosen position of said power abutment.

3. In combination, a power abutment movable upon supply of fluid under pressure to a chamber, valve means operable to supply fluid under pressure to said chamber, a valve device operable to cut off said supply of fluid under pressure to said chamber and to vent fluid under pressure from said chamber, a pilot abutment movable by fluid under pressure, actuating means connecting said valve means to said power and pilot abutments providing for movement of said abutments relative to each other and in unison, said pilot abutment being movable by fluid under pressure to first actuate said valve means and then to a certain position to effect operation of said valve device, said actuating means including lever means operatively connected to said pilot and power abutments, and a rod connecting said lever means and valve means, fixed stop means, and adjustable stop means associated with said rod and arranged to engage said fixed stop means in a position of said pilot abutment effecting operation of said valve means to prevent further movement of said pilot abutment relative to said power abutment and providing for said pilot abutment obtaining said certain position in a chosen position of said power abutment.

4. In combination, a power abutment movable upon supply of fluid under pressure to a chamber, valve means operable to supply fluid under pressure to said chamber, a valve device operable to cut off said supply of fluid under pressure to said chamber and to vent fluid under pressure from said chamber, a pilot abutment movable by fluid under pressure, a lever having one connection with said power abutment and another connection with said pilot abutment, a rod for actuating said valve means connected to said lever, fixed stop means, adjustable stop means on said rod arranged to cooperate with said fixed stop means to limit movement of said rod to a position for actuating said valve means, said pilot abutment being movable by fluid under pressure relative to said power abutment to actuate said lever and thereby said rod to said position, and being then movable with said power abutment relative to said rod and being operative in a chosen position of said power abutment to effect operation of said valve device.

5. In combination, a double acting power piston, a valve device comprising an operating member having a first position for supplying fluid under pressure from a chamber to one side of said power piston for moving same in one direction and having a second position for supplying fluid under pressure from said chamber to the opposite side of said power piston for moving same in the opposite direction, valve means operable to supply fluid under pressure to said chamber and also operable to cut off such supply and open said chamber to atmosphere, a pilot piston, a lever connecting said pistons, a rod connecting said lever to said valve device, said pilot piston being operable upon movement relative to said power piston in one direction to actuate said lever and rod to move said operating member to its said first position and in the opposite direction to actuate said lever and rod to move said operating member to said second position, said pilot piston being also movable in said one direction after said operating member is in said first position to one unloading position and in said opposite direction after said operating member is in said second position to another unloading position, means arranged to limit movement of said pilot piston to the two unloading positions, means operable upon movement of said pilot piston to both of said unloading positions to effect operation of said valve means to cut off the supply of fluid under pressure to said chamber and open said chamber to atmosphere and operable with said pilot piston out of said unloading positions to effect operation of said valve means to supply fluid under pressure to said chamber, fixed stop means, and adjustable means on said rod arranged to cooperate with said fixed stop means to limit movement of said pilot piston in both directions relative to said power piston to positions for positioning said operating member in either its said first or second positions, said lever then providing for movement of said pilot piston with said power piston, and said adjustable means providing for said pilot piston obtaining its said unloading positions in chosen positions of said power piston.

6. In combination, a double acting power piston, a valve device comprising an operating member having a neutral position for opening opposite sides of said piston to atmosphere, a forward position for opening communication between a chamber and one side of said piston for supplying fluid under pressure to act on said piston to move same in one direction, and a reverse position for opening communication between said chamber and the opposite side of said piston for supplying fluid under pressure to act on the piston for moving same in the opposite direction, unloading means operable to supply fluid under pressure to said chamber and also operable to cut off such supply of fluid under pressure and to open said chamber to atmosphere, a pilot piston, a lever connected to said power piston and to said pilot piston providing for movement of said pistons relative to each other and in unison, a rod connecting said lever to said operating member, said pilot piston having a neutral position and being operable upon movement therefrom in one direction to actuate said lever and rod to move said member to said forward position and being then further movable to one unloading position, and being operable upon movement in the opposite direction from neutral position to actuate said lever and rod to move said member to said reverse position and being then further movable to a second unloading position, means controlled by said pilot piston controlling said unloading means and operable in said unloading positions of said pilot piston to effect operation of said unloading means to cut off the supply of fluid under pressure to said chamber and to open said chamber to atmosphere and operable with said pilot piston out of said unloading positions to effect operation of said unloading means to supply fluid under pressure to said chamber, fixed stop means, adjustable stop means on said rod arranged to cooperate with said fixed stop means upon movement of said pilot piston relative to said power piston in either direction from neutral position to limit such movement to a degree providing for moving said operating member to either its forward or reverse position and then providing for said pilot piston obtaining said unloading positions upon further movement with said power piston in chosen positions of said power piston, means operative to move said pilot piston from either of its unloading positions to said neutral position, said pilot piston being operable upon movement from either unloading position to neutral position to effect movement of said operating member to either forward position or reverse position, and said power piston being then operable to effect movement of said operating member to its neutral position in a position of said power piston corresponding to neutral position of said pilot piston.

WILLIAM H. GLASS.